(12) United States Patent
Leech et al.

(10) Patent No.: US 7,636,861 B2
(45) Date of Patent: Dec. 22, 2009

(54) BUS TECHNIQUE FOR CONTROLLING POWER STATES OF BLADES IN A BLADE ENCLOSURE

(75) Inventors: Phillip A. Leech, Houston, TX (US); Dennis Baker, Houston, TX (US); William R. Jacobs, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 693 days.

(21) Appl. No.: 11/045,829

(22) Filed: Jan. 27, 2005

(65) Prior Publication Data

US 2006/0168462 A1    Jul. 27, 2006

(51) Int. Cl.
*G06F 1/00* (2006.01)
*G06F 1/26* (2006.01)
*G06F 1/32* (2006.01)
*G06F 15/16* (2006.01)

(52) U.S. Cl. .................. 713/310; 713/300; 713/323; 709/208

(58) Field of Classification Search ................ 713/310, 713/300, 323; 709/208
See application file for complete search history.

(56) References Cited

U.S. PATENT DOCUMENTS

| 4,907,150 | A | * | 3/1990 | Arroyo et al. ............... 713/323 |
| 5,497,494 | A | * | 3/1996 | Combs et al. ............... 713/323 |
| 5,652,892 | A | * | 7/1997 | Ugajin ....................... 713/310 |
| 5,692,197 | A | * | 11/1997 | Narad et al. ................ 713/323 |
| 6,243,831 | B1 | * | 6/2001 | Mustafa et al. ............... 714/24 |
| 6,360,327 | B1 | | 3/2002 | Hobson ..................... 713/300 |
| 6,430,687 | B1 | * | 8/2002 | Aguilar et al. .................. 713/2 |
| 6,950,952 | B2 | * | 9/2005 | Felsman ..................... 713/310 |
| 6,968,466 | B2 | * | 11/2005 | Bolian et al. ............... 713/300 |
| 2005/0216627 | A1 | * | 9/2005 | Goud et al. ................. 710/100 |
| 2006/0161796 | A1 | * | 7/2006 | Cromer et al. .............. 713/323 |

OTHER PUBLICATIONS

"Advanced Configuration and Power Interface Specification" Rev 3.0, Sept. 2, 2004, pp. 22, 25-35.

* cited by examiner

Primary Examiner—Ji H Bae

(57) ABSTRACT

A blade enclosure includes a plurality of blades, an enclosure manager processing device and a bus coupling the enclosure manager processing device to each of the blades. Each blade has at least one power mode bit configured to be controlled by the enclosure manager processing device via the bus, and each blade is configured to cause itself to enter a working state or a sleeping state responsive to its at least one power mode bit.

16 Claims, 8 Drawing Sheets

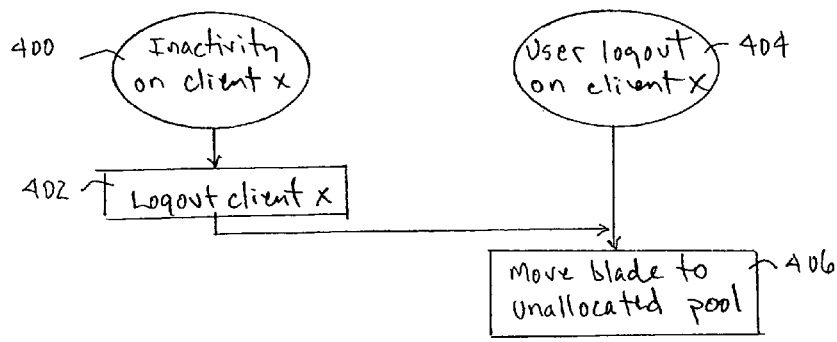
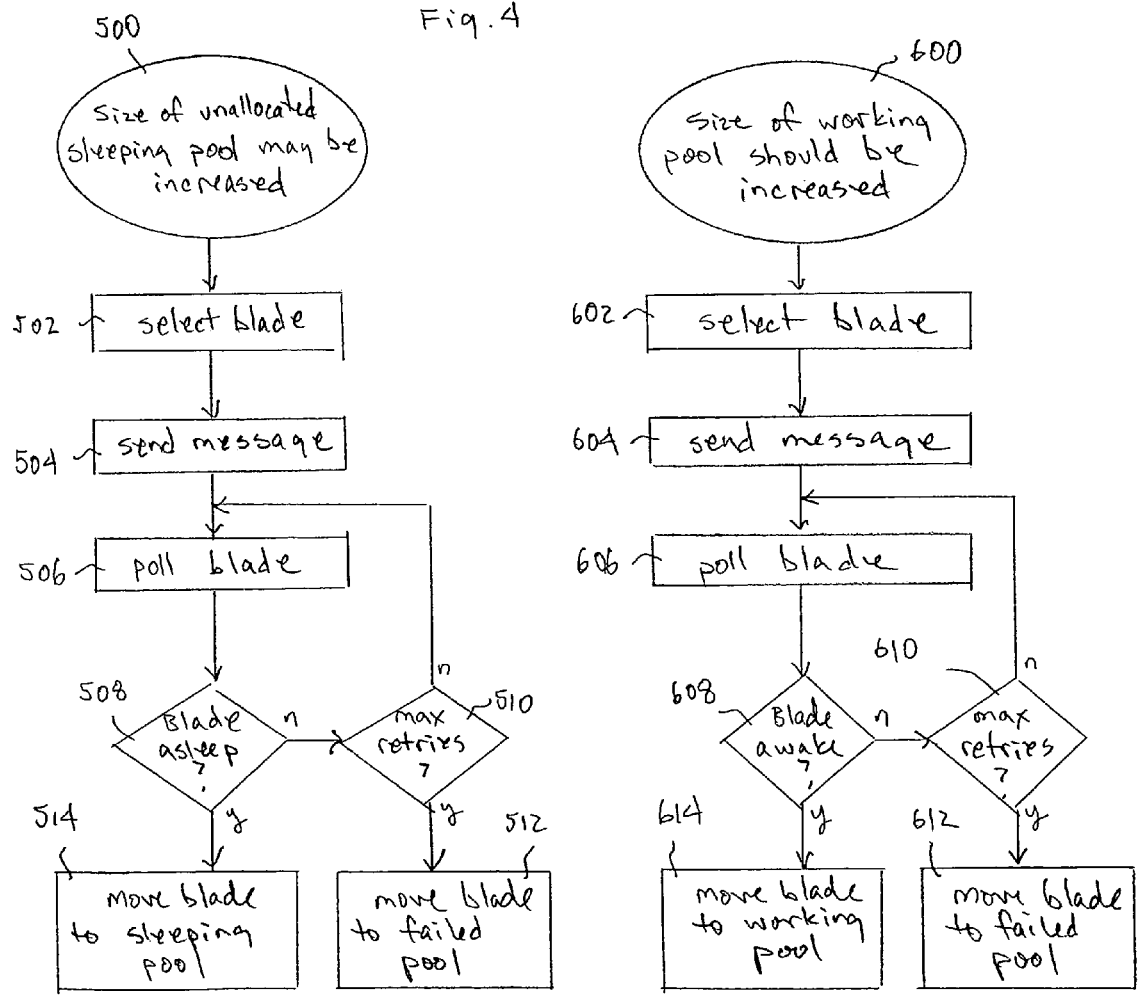
Fig. 4
Fig. 5
Fig. 6

BUS TECHNIQUE FOR CONTROLLING POWER STATES OF BLADES IN A BLADE ENCLOSURE

RELATED APPLICATIONS

This patent application shares disclosure material in common with co-pending patent application Ser. No. 11/045,965, filed Jan. 27, 2005, titled "Power Conservation Technique for Blade Computer Systems."

FIELD OF THE INVENTION

This invention relates generally to blade computer systems, and more particularly to techniques for conserving power in blade computer systems.

BACKGROUND

A blade enclosure is an enclosure that contains two or more computer motherboards commonly referred to as "blades." Typically each blade in a blade enclosure includes one or more processors, main memory, one or more network interfaces and optionally some secondary storage such as one or more disk drives. Within a given blade enclosure, each blade shares cooling and power infrastructure with the other blades in the enclosure. By way of example, FIG. 1 illustrates a blade enclosure 100 according to the prior art. Blade enclosure 100 includes m blades 102, each of which may include a bus interface 104 and a network interface 106. The network interfaces of blades 102 may be connected to a network directly or indirectly, such as through an internal switch and/or router 108 as shown. Each of blades 102 may share certain enclosure resources such as power supply 110 and cooling system 112. An additional computing device, illustrated here as enclosure manager 114, provides administrative functionality necessary to manage the resources within the enclosure. Administrative software 116 runs on a processor of enclosure manager 114 for this purpose. Enclosure manager 114 is connected to each of blades 102 via an internal bus 118. Bus 118 may take any of a variety of conventional forms. In one embodiment, bus 118 was implemented using the well-known I2C protocol promulgated by the Philips Electronics Company, and bus interfaces 104 were I2C expander devices.

FIG. 2 illustrates a typical deployment for blade enclosures such as blade enclosure 100. Blade computer system 200 includes one or more client devices 202, one or more blade enclosures 100 and an allocation server 204, all in communication via a network 206. In such a system, allocation server 204 dynamically establishes a mapping, as needed, between client devices 202 and individual blades 102 that are housed within blade enclosures 100. The configuration of FIG. 2 improves utilization of hardware relative to stand-alone computer deployments because individual blades need not be dedicated to a single user, but instead may be allocated to users dynamically as clients 202 become active and inactive. The result is that a given blade might provide processor and main memory resources to support the processes of client 1 for a time, and then later for client 2 when client 1 no longer needs those resources. Persistent data belonging to clients 1 and 2 may be retained in network storage devices (not shown) that are also coupled to network 206. The configuration of FIG. 2 delivers other advantages as well, such as easier system administration for blades 102 relative to the system administration that is required for distributed, stand-alone computers.

One difficulty in the design of blade enclosures 100 is the aggregate power consumption of and the heat generated by the blades that are housed within the blade enclosure.

By way of background, methods have been developed to reduce power consumption for stand-alone computers. One such method is called operating system-directed power management ("OSPM") and is described in the well-known Advanced Configuration and Power Interface ("ACPI") specification. OSPM/ACPI-compliant computers are capable of existing in a working state in which all system resources are powered on and are ready to perform useful work immediately, or in any one of a spectrum of sleeping states in which power consumption is reduced. The sleeping states are numbered S1 to S5. In sleeping state S1, for example, all system context and main memory contents are maintained so that the system may be returned to the working state with a minimal amount of latency. In sleeping state S5, on the other hand, no system context or main memory contents are maintained. From this state, a complete boot is required to return the system to the working state. In the intermediate sleeping state S3, system memory is maintained, but all other system context is lost. A system may be returned to the working state from S3 simply by resuming control at the processor's reset vector.

In an OSPM/ACPI-compliant computer, the local host operating system directs all system and device power state transitions. In such a computer, the local host operating system has complete discretion to place the computer into one of the sleeping states if it detects, for example, that certain resources of the computer have not been used for a predetermined period of time according to a local host timer. Alternatively, a human user may press a sleep button or a power-off button on the local host computer to induce the local host operating system to move the computer from the working state to one of the sleep states.

Although OSPM/ACPI achieves benefits for stand-alone computers normally attended by human users, the inventors hereof have discovered that it is not possible to apply the teachings of the ACPI specification directly to blade computers such as blades 102. This is so for a variety of reasons including the facts that blades 102 are not normally attended by human users and that each of blades 102 has its own operating system. If the teachings of the ACPI specification were applied directly to blade enclosure 100, then each of the blades 102 within the server would independently be able to place itself into one of the sleeping states at any arbitrary time. If this were to happen, then a subsequent request issued to a sleeping blade by enclosure manager 114 or by allocation server 204 would either not be acknowledged or would be acknowledged with such latency that enclosure manager 114 or allocation server 204 would conclude that the blade had malfunctioned or no longer existed. The result would be that the sleeping blade would cease to be used.

BRIEF DESCRIPTION OF THE DRAWINGS

FIGS. 4-6 are flow diagrams illustrating preferred behaviors of the allocation server of FIG. 3.

DETAILED DESCRIPTION OF THE PREFERRED EMBODIMENTS

Figure 1:
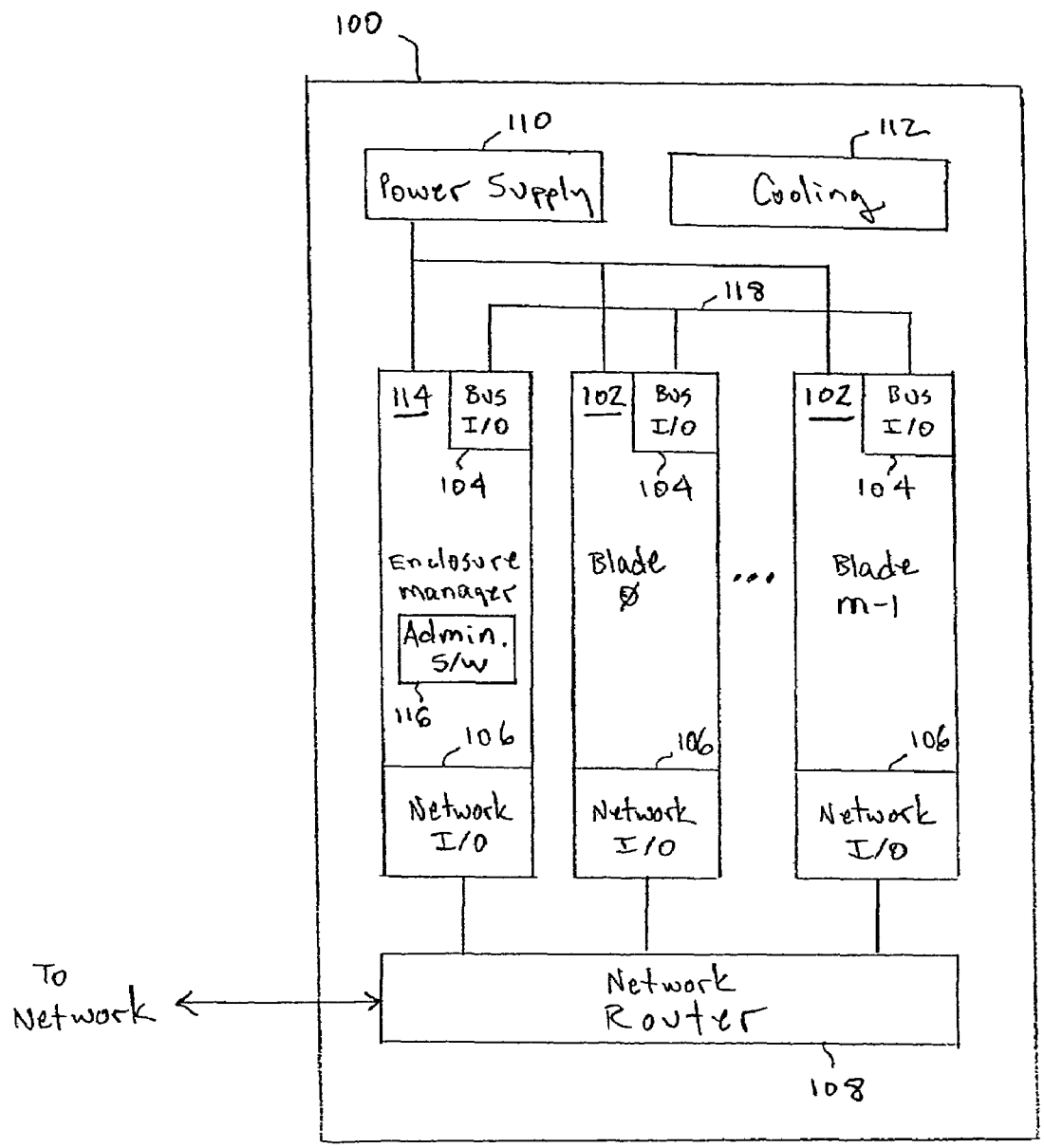
FIG. 1 is a block diagram illustrating a prior art blade enclosure.
Figure 2:
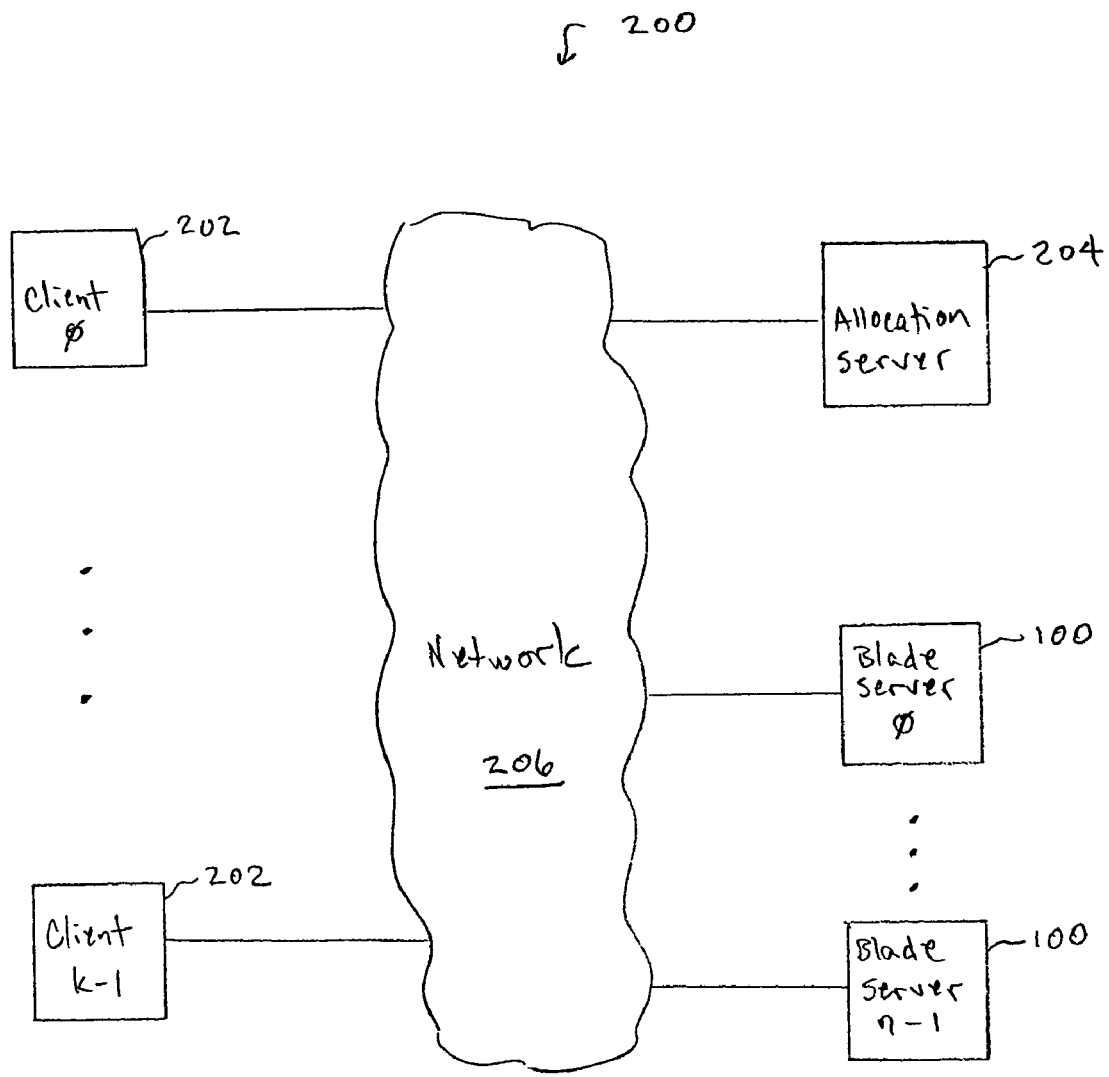
FIG. 2 is a block diagram illustrating a prior art blade computer system utilizing blades in blade enclosures such as the blade enclosure of FIG. 1.
Figure 3:
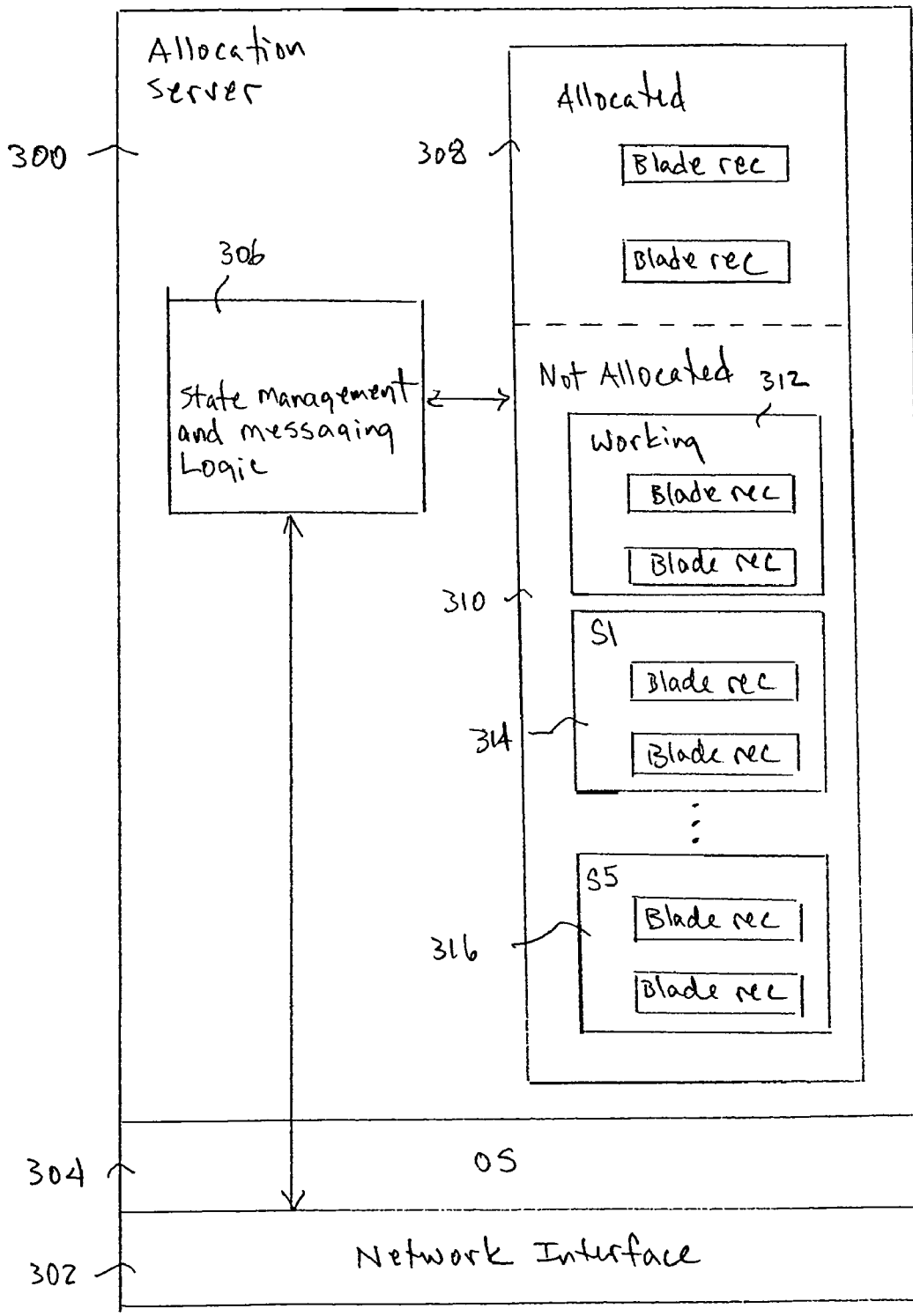
FIG. 3 is a block diagram illustrating an allocation server suitable for use in conjunction with a blade enclosure according to a preferred embodiment of the invention.

FIG. 3 illustrates an allocation server 300 suitable for use in conjunction with a blade enclosure according to a preferred embodiment of the invention. Allocation server 300 includes at least a network interface 302, an operating system 304, state management and messaging logic 306 and certain data structures to be described next. In one embodiment, allocation server 300 may maintain data structures 308 and 310. In data structure 308, records are maintained representing blades that are currently allocated to a client device 202. Typically, although not necessarily, allocated blades will be in a working state. In data structure 310, records are maintained representing blades that are currently not allocated to a client device 202. A subset 312 of the blades in data structure 310 may be in a working state, while numerous other subsets 314-316 may be in a sleeping state. For example, five subsets of blade records may be maintained to represent sleeping blades, one subset for each of the ACPI sleep states S1 to S5 as suggested in the drawing. In other embodiments, fewer than five sleeping blade subsets may be maintained. For example, in a preferred embodiment, blades may be placed into the ACPI state S3 when sleeping. In such an embodiment, only one subset of sleeping blade records need be maintained. The latter design provides a reasonable compromise between power savings and wake-up latency. In yet other embodiments, the policy may be that all blades in a working state are allocated to client devices and that all blades not allocated to client devices are placed immediately into a sleeping state. Various other policies are also possible and will be appreciated readily by those having ordinary skill in the art and having reference hereto.

FIGS. 4-7 illustrate preferred behaviors for state management and messaging logic 306. As shown in FIG. 4, either of two conditions may cause logic 306 to move a blade from set 308 of allocated blades to set 310 of non-allocated blades. First, a blade may be moved from set 308 to set 310 if the client device to which the blade was allocated intentionally logs out of its session (shown at 404, 406). Second, logic 306 may move a blade from set 308 to set 310 after logging the blade's client out of its session involuntarily due to inactivity (shown at 400, 402, 406). Client inactivity may be detected by a variety of means including, for example, comparing the time elapsed since the last client keyboard or mouse activity with a predetermined maximum time.

Referring now to FIG. 5, logic 306 may from time to time determine in step 500 that the number of sleeping blades in set 310 may be increased in order to conserve power within a blade enclosure. Many policies are possible for making this determination. A few of these possibilities will now be discussed by way of example. First, logic 306 may be implementing the policy described above in which a blade is immediately placed in a sleeping state when it becomes deallocated from a client. If so, then logic 306 may determine that the number of sleeping blades may be increased as soon as a blade is deallocated from a client (in which case the blade selected in step 502 for movement into a sleeping state will be the just-deallocated blade). Second, logic 306 may be implementing the policy described above in which one or more blades that are not currently allocated to a client are nevertheless maintained in a working state. If so, then logic 306 may determine that the number of sleeping blades may be increased (and the size of the unallocated-but-working pool decreased) when the number of unallocated-but-working blades exceeds a threshold number. The threshold number may be made fixed or variable as necessary to strike a balance between the need for reducing power consumption within the blade enclosure and the need to maintain low latency when a new client requests that it be allocated a blade for processing. Third, and perhaps as a way of striking the just-described balance, logic 306 may determine that a blade should be moved from a working to a sleeping state after the blade has been in the working-but-unallocated state for more than a threshold amount of time. The threshold amount of time may be made fixed or variable as appropriate given the current level of system utilization.

Once a blade has been selected in step 502 for transition to a sleeping state (the selection may be made using any criteria including, for example, those just described), logic 306 sends a network message in step 504 to an entity in the server that contains the selected blade. The message is for the purpose of causing the selected blade to enter a sleeping state. (More details will be provided below regarding techniques for accomplishing the transition of the blade from a working state to a sleeping state.) In steps 506-510, logic 306 may optionally then poll the blade enclosure with an additional network message to determine whether the blade successfully entered the sleeping state. If logic 306 does so, then it may determine after a predetermined number of unsuccessful retries that the blade has failed. In that event, logic 306 may update its data structures to indicate an error condition in the blade (step 512). For example, logic 306 might move the blade's record to a "failed" pool. In other embodiments, a network protocol may be established such that the blade enclosure will automatically respond to logic 306 with an appropriate acknowledgment message, thus eliminating the need for polling. If, on the other hand, logic 306 determines that the blade has successfully entered the sleeping state, it may update its data structures accordingly in step 514 such as by moving the blade's record into one of the sleeping state subsets of structure 310.

Referring now to FIG. 6, logic 306 may also from time to time determine in step 600 that the number of working blades in either set 310 or set 308 should be increased. As was the case with step 500, numerous policies are possible for making this determination. For example, logic 306 may need to wake a blade each time a new client requests to be allocated a blade. This will be so in the scenario where no pool of working-but-unallocated blades is kept. Or, logic 306 may keep a pool of working-but-unallocated blades. In that case, logic 306 may decide to wake a blade in order to keep the pool of working-but-unallocated blades at least as large as a threshold size. Such a threshold size may be fixed or variable depending on system load conditions.

Once the determination of step 600 is made, a blade is selected in step 602 for transition to the working state. The selection may be made using any criteria such as, for example, selecting the least-recently used sleeping blade. In step 604, logic 306 sends a network message to an entity in the blade enclosure that contains the selected blade. The message is for the purpose of causing the selected blade to enter the working state. (More details will be provided below regarding techniques for accomplishing the transition of the blade from a sleeping state to the working state.) Steps 606-614 are analogous to steps 506-514 described above. Logic 306 may poll the blade enclosure with an additional network message to determine whether the blade successfully entered the working state (step 606). If logic 306 does so, then it may determine after a predetermined number of unsuccessful retries that the blade has failed (steps 608-610). In that event, logic 306 may update its data structures to indicate an error condition in the blade (step 612). Alternatively, the blade enclosure may be programmed to automatically respond to logic 306 with an appropriate acknowledgment message. But if logic 306 determines that the blade has successfully entered the working state, it may update its data structures accordingly in step 614 such as by moving the blade's record into structure 308 or the working subset of structure 310 as appropriate.

A mechanism according to a preferred embodiment of the invention for implementing the functionality suggested by steps 504 and 604 will now be described in detail with reference to FIGS. 7-11.

Figure 7:
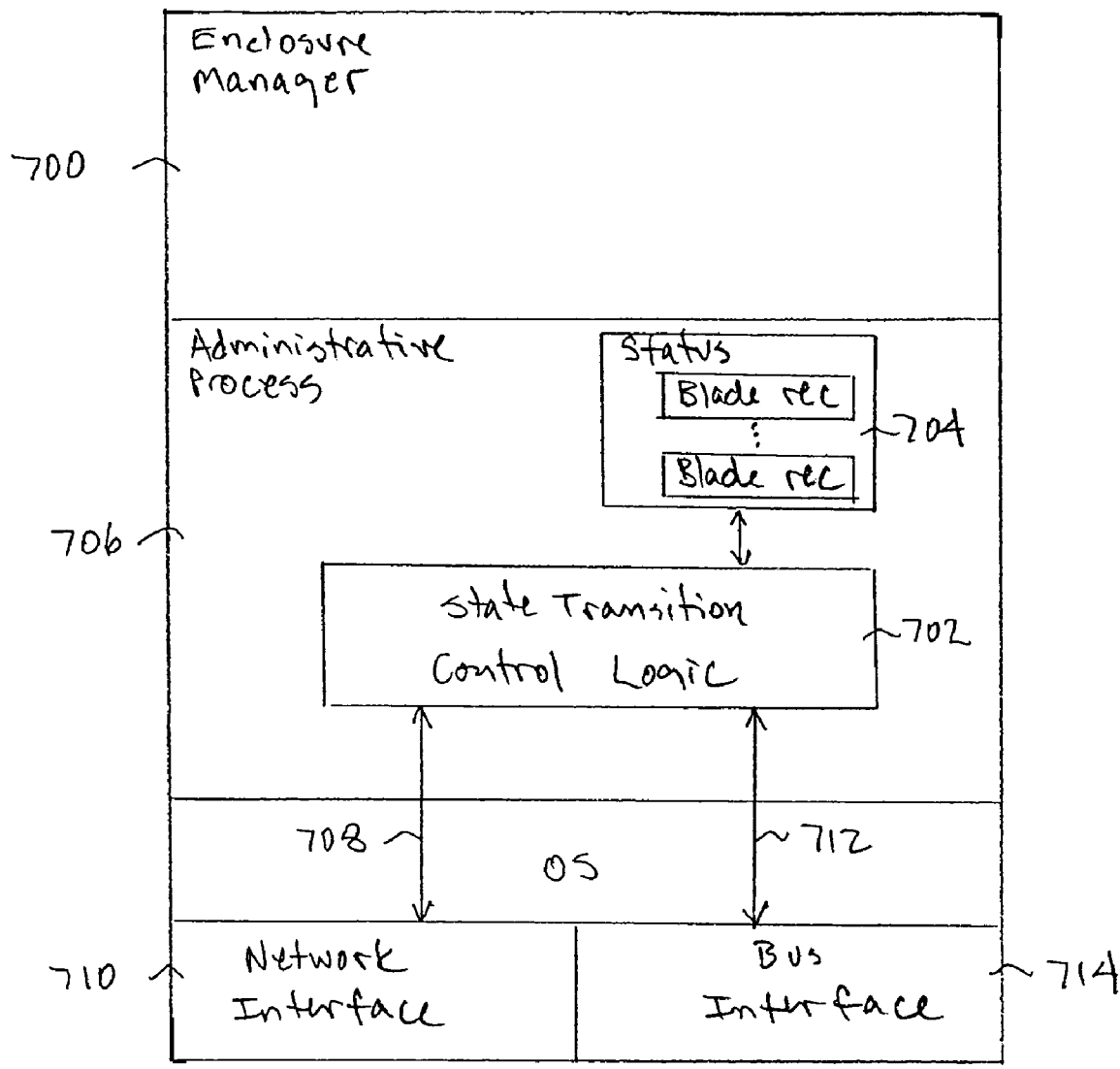
FIG. 7 is a block diagram illustrating an enclosure manager according to a preferred embodiment of the invention.

FIG. 7 illustrates an enclosure manager device 700 for inclusion in a blade enclosure. Enclosure manager 700 preferably includes state transition control logic 702 and associated data structures 704 for recording status information about the blades in the blade enclosure. Whether implemented in hardware, software or firmware, logic 702 and data structures 704 may be referred to herein as being part of an administrative process 706. Use of the term "administrative process" is intended to include any such hardware, software or firmware embodiments. As indicated at 708, logic 702 is operable to receive network messages from allocation server 300 via network interface 710. As indicated at 712, logic 702 is also operable to communicate with the blades in the host blade enclosure via a bus 118. It may do so using bus interface 714.

Figure 8:
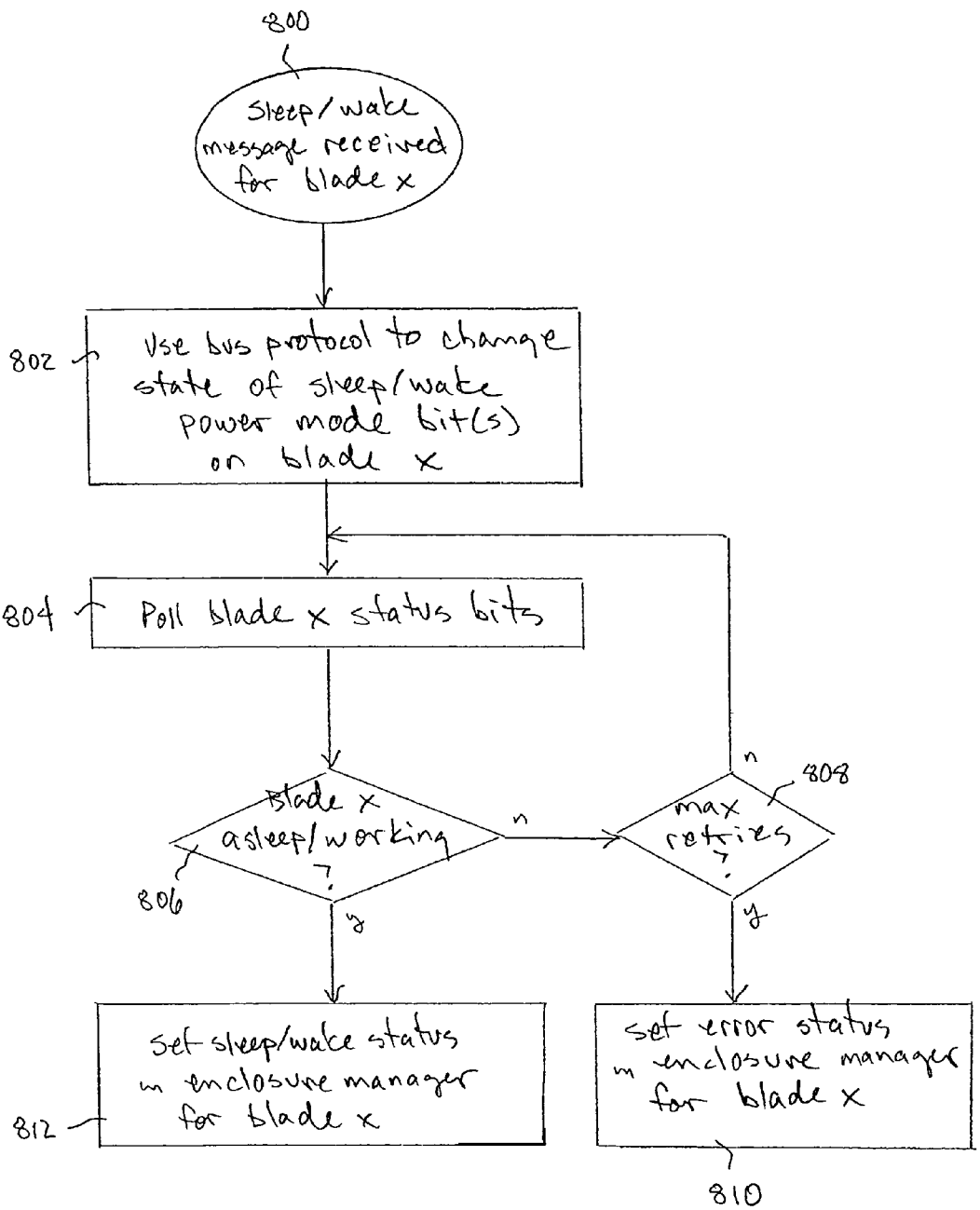
FIG. 8 is a flow diagram illustrating preferred behaviors of the enclosure manager of FIG. 7.

FIG. 8 illustrates preferred behaviors for state transition and control logic 702. In step 800, logic 702 receives one or more network messages from allocation server 300. The message (or messages) identifies one of the blades in the blade enclosure and may request either that the identified blade be placed into a sleeping state or that it be placed into the working state. Depending on the message, logic 702 uses bus 118 in step 802 to change the state of a sleep bit or a wake bit on the identified blade. The sleep and wake bits may be the same bit in some embodiments, or they may be separate bits in other embodiments. The term "power mode bits" will be used herein to refer to these control bits in either class of embodiment. Logic 702 may then optionally update data structure 704 to indicate that the blade is in transition between power states. As indicated in steps 804-808, logic 702 may then use bus 118 to poll status bits on the blade to verify whether the blade has made the requested power state transition. If after a predetermined number of unsuccessful retries the blade has not successfully made the transition, then logic 702 may update data structures 704 to indicate an error condition on the blade (step 810). Alternatively, a bus protocol may be implemented such that the blade sends an acknowledgment to logic 702, eliminating the need for polling. If logic 702 determines that the blade has successfully made the requested state transition, then it may update data structures 704 to so indicate (step 812).

Figure 9:
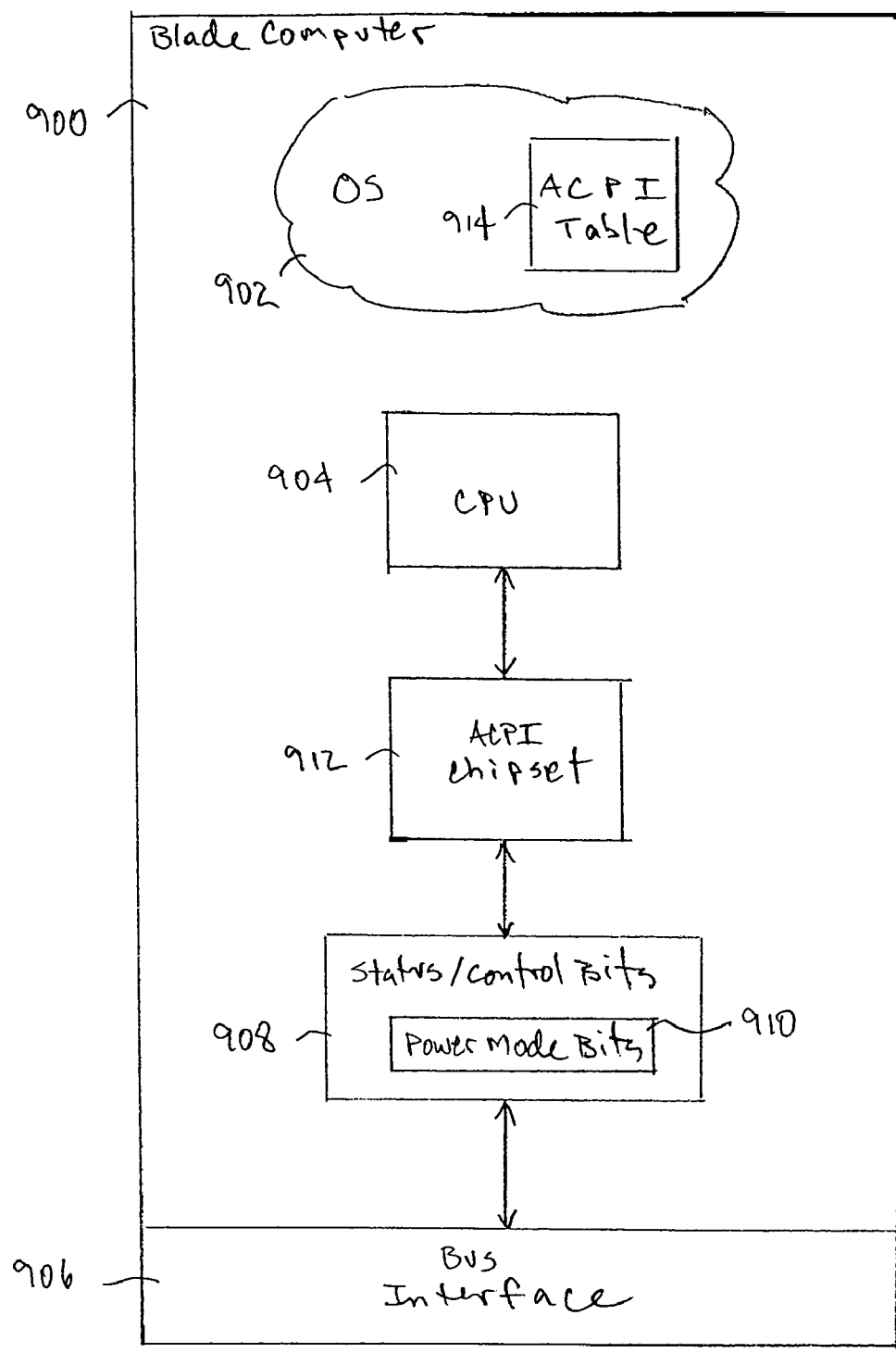
FIG. 9 is a block diagram illustrating a blade computer according to a preferred embodiment of the invention.

FIG. 9 illustrates a blade 900 for inclusion in a blade enclosure. Blade 900 preferably includes a mechanism for causing itself to enter a working state from a sleeping state and vice versa. One such mechanism is as follows. An OSPM/ACPI-compliant operating system 902 may be provided for execution by CPU 904. Bus interface 906 may be coupled to bus 118 and to status and control bits 908. Both status and control bits 908 and CPU 904 may be coupled to an ACPI-compliant chipset 912. Preferably, status and control bits 908 include at least one power mode control bit 910, which bit or bits play the role of the sleep and wake bits described above.

Figure 10:
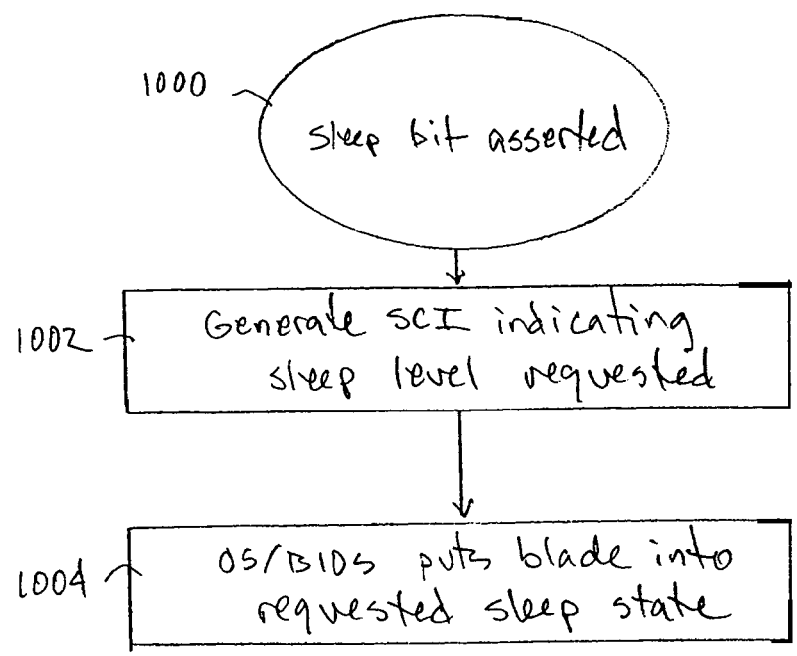
FIGS. 10-11 are flow diagrams illustrating preferred behaviors of the blade computer of FIG. 9.
Figure 11:
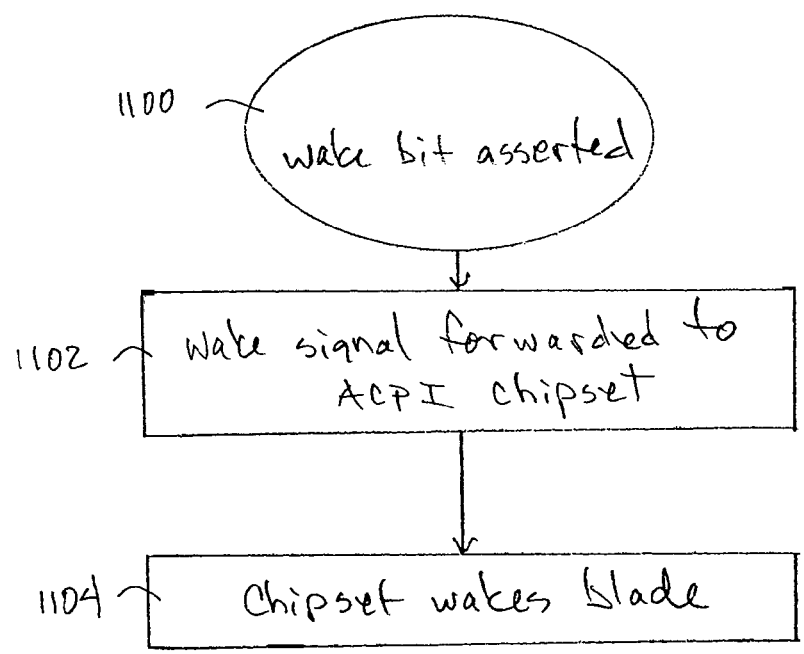

FIGS. 10-11 illustrate preferred behaviors for blade 900. Referring now to FIG. 10, power mode bits 910 may be set in step 1000 to indicate a sleep signal, which signal is forwarded to ACPI chipset 912. Operating system 902, in association with the underlying BIOS, then causes the blade to move from the working state to whichever sleep state is indicated by the sleep signal. As suggested in steps 1002-1004, this may be accomplished using an interrupt, such as a system control interrupt ("SCI") or a system management interrupt ("SMI"), and appropriate entries in an ACPI table 914. Referring now to FIG. 11, when power mode bits 910 are set in step 1100 to indicate a wake signal, the wake signal is forwarded to ACPI chipset 912 (step 1102). Chipset 912 then wakes the blade (step 1104) in association with operating system 902, the underlying BIOS and appropriate entries in ACPI table 914.

While the invention has been described in detail with reference to preferred embodiments thereof, the described embodiments have been presented by way of example and not by way of limitation. It will be understood by those skilled in the art that various changes may be made in the form and details of the described embodiments without deviating from the spirit and scope of the invention as defined by the appended claims.

What is claimed is:

1. A method of controlling power states of blades in a blade enclosure, comprising:
   executing an administrative process on an enclosure manager processing device within the blade enclosure;
   in the administrative process:
      receiving a network message from an entity outside the blade enclosure, the network message identifying a blade in the blade enclosure and indicating that the blade should be put in a sleeping state;
      using a bus within the blade enclosure, changing the state of a sleep bit on the blade; and
   in the blade, and responsive to the sleep bit, executing an interrupt service routine causing system software on the blade to put the blade into the sleeping state.

2. The method of claim 1, wherein:
   the entity outside the blade enclosure is an allocation server.

3. The method of claim 1, wherein:
   the sleeping state is an ACPI S3 state.

4. The method of claim 1, wherein:
   the bus is an I2C bus.

5. The method of claim 1, further comprising:
   in the blade, setting status bits to indicate whether or not the blade has successfully entered the sleeping state; and
   in the administrative process, reading the status bits on the blade.

6. The method of claim 5, further comprising:
   in the administrative process, if reading the status bits indicates that the blade did not successfully enter the sleeping state, updating a data structure to indicate an error in the blade.

7. A method of controlling power states of blades in a blade enclosure, comprising:
   executing an administrative process on an enclosure manager processing device within the blade enclosure;
   in the administrative process:
      receiving a network message from an entity outside the blade enclosure, the network message identifying a blade in the blade enclosure, the blade being in a sleeping state, and indicating that the blade should be put in a working state;

using a bus within the blade enclosure, changing the state of a wake bit on the blade; and in the blade, and responsive to the wake bit, executing an interrupt service routine causing system software on the blade to put the blade into the working state.

8. The method of claim 7, wherein:

the entity outside the blade enclosure is an allocation server.

9. The method of claim 7, wherein:

the sleeping state is an ACPI S3 state.

10. The method of claim 7, wherein:

the bus is an I2C bus.

11. The method of claim 7, further comprising:

in the blade, setting status bits to indicate whether or not the blade has successfully entered the working state; and in the administrative process, reading the status bits on the blade.

12. The method of claim 11, further comprising:

in the administrative process, if reading the status bits indicates that the blade did not successfully enter the working state, updating a data structure to indicate an error in the blade.

13. A blade enclosure, comprising:

a plurality of blades;

an enclosure manager processing device; and a bus coupling the enclosure manager processing device to each of the blades;

wherein:

each blade has at least one power mode bit configured to be controlled by the enclosure manager processing device via the bus; and each blade is configured to cause itself to enter a working state or a sleeping state responsive to its at least one power mode bit.

14. The blade enclosure of claim 13, wherein:

the enclosure manager processing device is configured to control the state of the power mode bits on the blades responsive to a network message it receives from an entity outside the blade enclosure.

15. The blade enclosure of claim 13, wherein:

the sleeping state is an ACPI S3 state.

16. The blade enclosure of claim 13, wherein:

the bus is an I2C bus.

* * * * *

UNITED STATES PATENT AND TRADEMARK OFFICE
CERTIFICATE OF CORRECTION

| | |
|---|---|
| PATENT NO. | : 7,636,861 B2 |
| APPLICATION NO. | : 11/045829 |
| DATED | : December 22, 2009 |
| INVENTOR(S) | : Phillip A. Leech et al. |

Page 1 of 1

It is certified that error appears in the above-identified patent and that said Letters Patent is hereby corrected as shown below:

In column 6, line 52, in Claim 5, delete "selling" and insert -- setting --, therefor.

In column 7, line 17, in Claim 11, delete "selling" and insert -- setting --, therefor.

Signed and Sealed this

Thirteenth Day of April, 2010

David J. Kappos
*Director of the United States Patent and Trademark Office*